(12) United States Patent
Hur et al.

(10) Patent No.: US 8,675,805 B2
(45) Date of Patent: Mar. 18, 2014

(54) AUTOMATED PERIODIC SURVEILLANCE TESTING METHOD AND APPARATUS IN DIGITAL REACTOR PROTECTION SYSTEM

(75) Inventors: Seop Hur, Daejeon (KR); Inkoo Hwang, Daejeon (KR); Dong-Hoon Kim, Daejeon (KR); Jung Taek Kim, Daejeon (KR); Jong-Gyun Choi, Daejeon (KR); Jung-Woon Lee, Daejeon (KR); Gee Yong Park, Daejeon (KR); Jae-Chang Park, Daejeon (KR); Dong-Young Lee, Daejeon (KR); Kee-Choon Kwon, Daegu (KR)

(73) Assignees: Korea Atomic Energy Research Institute, Daegeon (KR); Korea Hydro & Nuclear Power Co., Ltd., Seoul (KR)

( * ) Notice: Subject to any disclaimer, the term of this patent is extended or adjusted under 35 U.S.C. 154(b) by 583 days.

(21) Appl. No.: 12/961,936

(22) Filed: Dec. 7, 2010

(65) Prior Publication Data
US 2011/0150162 A1    Jun. 23, 2011

(30) Foreign Application Priority Data
Dec. 23, 2009 (KR) ............. 10-2009-0129818

(51) Int. Cl.
G21C 17/00    (2006.01)
(52) U.S. Cl.
USPC ........................................................ 376/259
(58) Field of Classification Search
USPC ........................................................ 376/259
See application file for complete search history.

(56) References Cited

U.S. PATENT DOCUMENTS

| 6,845,301 B2 | 1/2005 | Hamamatsu et al. |
| 2004/0136487 A1* | 7/2004 | Shin et al. ............... 376/259 |
| 2005/0017848 A1 | 1/2005 | Flen et al. |

FOREIGN PATENT DOCUMENTS

| CN | 1369945 A | 9/2002 |
| CN | 1671035 A | 9/2005 |
| CN | 101605078 A | 12/2009 |
| KR | 10-2009-0054838 A | 6/2009 |

* cited by examiner

Primary Examiner — Timothy A Brainard
(74) Attorney, Agent, or Firm — Westman, Champlin & Koehler, P.A.

(57) ABSTRACT

Provided is an automated periodic surveillance testing method and apparatus in a digital reactor protection system, which unites a passive testing means such as a self-diagnosis or an on-line state comparison with an active testing means such as an automatic logic test and the like in the digital reactor protection system. Accordingly, a device self-diagnosis, an on-line state diagnosis, and an automatic logic test are used as the automated periodic surveillance testing method in the digital reactor protection system. Thus, the time consumed in a periodic surveillance test can be minimized, thereby saving reactor operating costs, and excessive manpower can be avoided, thereby decreasing potential human errors. Also, a channel detour time at which one of multiple channels is detoured can be minimized based on the automated periodic surveillance test in the digital reactor protection system, thereby enhancing stability.

12 Claims, 14 Drawing Sheets

FIG. 5A

| Module | Self-diagnosis information | Fault category | System management item | | | Remark |
|---|---|---|---|---|---|---|
| | | | BP | CP | ATIP | |
| Power module | Back-up Battery Low | M | Warning | Warning | Warning | |
| | Main power module warning | M | Warning | Warning | Warning | |
| | Auxiliary power module warning | M | Warning | Warning | Warning | |
| | Main power module input power warning | M | Warning | Warning | Warning | |
| | Auxiliary power module input power warning | M | Warning | Warning | Warning | |
| | Main power module detachment warning | M | Warning | Warning | Warning | |
| | Auxiliary power module detachment warning | M | Warning | Warning | Warning | |
| Processor module | Processor module memory error | H | Trip | Trip | Trip | |
| | Application program execution period violation | H | Trip | Trip | Trip | |
| | Application program checksum (In initialization) | H | Trip | Trip | Warning | |
| | RTC Warning | M | Warning | Warning | Warning | |
| | OS Checksum (In initialization) | H | Trip | Trip | Warning | |
| | Bus Time-out | M | Warning | Warning | Warning | |
| HR-SDL | SDL CPB Initialization error | M | Warning | Trip | Warning | |
| | SDL CH_0 Error (Including CRC Error) | H | Detour as-is | Trip | Warning | |
| | SDL CH_1 Error (Including CRC Error) | H | Detour as-is | Trip | Warning | |
| | SDL CH_2 Error (Including CRC Error) | H | Detour as-is | Trip | Warning | |
| | SDL CH_3 Error (Including CRC Error) | H | Detour as-is | Trip | Warning | |
| | Processor/CPB Interface error | H | Detour as-is | Trip | Warning | |
| | CPB/CH_0 Driver interface error | H | Detour as-is | Trip | Warning | |
| | CPB/CH_1 Driver interface error | H | Detour as-is | Trip | Warning | |
| | CPB/CH_2 Driver interface error | H | Detour as-is | Trip | Warning | |
| | CPB/CH_3 Driver interface error | H | Detour as-is | Trip | Warning | |
| | CH_0 Driver module live list | H | Detour as-is | Trip | Warning | |
| | CH_1 Driver module live list | H | Detour as-is | Trip | Warning | |
| | CH_2 Driver module live list | H | Detour as-is | Trip | Warning | |
| | CH_3 Driver module live list | H | Detour as-is | Trip | Warning | |
| | HR-SDL Comprehesive error | L | Information | Information | Warning | |

FIG. 5B

| Module | Self-diagnosis information | Fault category | System management item | | | Remark |
|---|---|---|---|---|---|---|
| | | | BP | CP | ATIP | |
| FMS | FMS Module driver error | M | Warning | Warning | Warning | |
| | FMS Module SRAM Initalization error | M | Warning | Warning | Warning | |
| | FMS Module SRAM Intial diagnosis error | M | Warning | Warning | Warning | |
| | FMS Module SRAM Periodic diagnosis error | M | Warning | Warning | Warning | |
| | FMS Reception data CRC Error | M | Warning | Warning | Warning | |
| | FMS Data transmission error | M | Warning | Warning | Warning | |
| | Undefined data reception | M | Warning | Warning | Warning | |
| | FMS Module cable loss error | M | Warning | Warning | Warning | |
| | FMS Module port live list | M | Warning | Warning | Warning | |
| AI Module | AI CPU Monitoring WDT Timeout | H | Trip | N/A | N/A | |
| | AI Count value error | H | Trip | | | |
| | AI Loopback channel error | H | Trip | | | |
| | AI Input signal range excess | H | Trip | | | |
| | AI DPRAM Error (Initialization) | M | Warning | | | |
| | AI EEPROM Error (Initialization) | M | Warning | | | |
| | AI Channel usage setting error | M | Warning | | | |
| | AI Sampling/ Average value setting error | M | Warning | | | |
| | AI Loopback setting error | M | Warning | | | |
| | AI Resolution setting error | M | Warning | | | |
| | AI Current/ Voltage setting DIP fault | M | Warning | | | |
| | AI Mode setting hardware fault | M | Warning | | | |
| | AI Comprehesive warning | L | Information | | | |
| | AI Input signal range excess comprehensive error | L | Information | | | |
| | AI Loopback channel comprehensive error | L | Information | | | |

FIG. 5C

| Module | Self-diagnosis information | Fault category | System management item | | | Remark |
|---|---|---|---|---|---|---|
| | | | BP | CP | ATIP | |
| AO Module | AO CPU Monitoring WDT Timeout | H | N/A | N/A | Warning | |
| | AO Count value error | H | | | Warning | |
| | AO Loopback channel error | H | | | Warning | |
| | AO DPRAM Error (Initialization) | M | | | Warning | |
| | AO EEPROM Error (Initialization) | M | | | Warning | |
| | AO Channel usage setting error | M | | | Warning | |
| | AO Sampling/Average value setting error | M | | | Warning | |
| | AO Loopback setting error | M | | | Warning | |
| | AO Resolution setting error | M | | | Warning | |
| | AO Current/Voltage setting DIP fault | M | | | Warning | |
| | AO Mode setting hardware fault | M | | | Warning | |
| | AO Comprehesive warning | L | | | Information | |
| | AO Input signal range excess comprehensive error | L | | | Information | |
| | AO Loopback channel comprehensive error | L | | | Information | |
| DI Module | DI Count value error | H | Trip | Detour as-is | Information | |
| | DI Individual channel error | H | Trip | Detour as-is | Information | |
| | DI Individual group (0~4) input voltage impossible | M | | Information | Information | |
| | DI Input voltage comprehensive error | L | Information | Information | Information | |
| | DI Channel comprehensive error | L | Information | Information | Information | |
| DO Module | DO Count value error | H | N/A | Warning | Warning | |
| | DO Individual channel error | H | | Warning | Warning | |
| | DO Individual group (0~4) input voltage impossible | M | | Warning | Warning | |
| | DO Input voltage comprehensive error | L | | Information | Information | |
| | DO Channel comprehensive error | L | | Information | Information | |
| DOR Module | DOR Count value error | H | N/A | Trip | Warning | |
| | DOR Individual channel error | H | | Trip | Warning | |
| | DOR Individual group (0~4) input voltage impossible | M | | Warning | Warning | |
| | DOR Input voltage comprehensive error | L | | Information | Information | |
| | DOR Channel comprehensive error | L | | Information | Information | |

FIG. 8

| Processor | Permission condition (AND) | Start restricted condition * (OR) | Stop condition * (OR) |
|---|---|---|---|
| Bistable processor (BP) | No trip/Auxiliary trip exists in all trip variables as result of previous scan | O | O |
| | Nonexistence of manual initiation automatic test and manual test signal | O | O |
| | No occurrence of BP error | O | O |
| | No test stop signal from ATIP | | O |
| | Existence of test start signal from ATIP | O | |
| | Self-correspondance of id of processor to be tested from ATIP | O | |
| | No end signal from self-test time check timer | | O |
| Coincidnence processor (CP) | No trip/Auxiliary trip for any variable from BP of all channels | O | O |
| | No trip as result of previous scan | O | O |
| | Nonexistence of manual initiation automatic test and manual test signal | O | O |
| | No occurrence of CP error | O | O |
| | No test stop signla from ATIP | | O |
| | Existence of test start signal from ATIP | O | |
| | Self-correspondence of id of processor to be tested from ATIP | O | |
| | No end signal from self-test time check timer | | O |
| | No error of pulsatile signal of BP | O | O |
| | No detour of all channels (Or exsistence of only self-channel detour) | O | O |
| Automatic test and interface processor (ATIP) | Nonexistence of Trip/Auxiliary trip in state information from BP and CP of self-channel | O | O |
| | No error of ATIP, BP and CP modules | O | O |
| | Nonexistence of manual initiation automatic test and manual test signal | O | O |
| | No error state of test result (Including abnormal test end) | | O |
| | No end signal from self-test time check timer | | O |
| | No detour of self-channel | O | O |
| | Existence of testable signal from ATIP of other channel | O | |

FIG. 9A

| Logging system | |
|---|---|
| Test type selection | |
| ○ On-line state diagnosis | ○ Device self-diagnosis |
| ⦿ Automatic periodic test | ○ Manual initiation automatic test |

| | |
|---|---|
| PAT01_2009-11-01 08:10 | SUCESS |
| PAT02_2009-11-02 08:10 | SUCESS |
| PAT03_2009-11-03 08:10 | SUCESS |
| PAT04_2009-11-05 08:10 | SUCESS |
| PAT05_2009-11-06 08:10 | SUCESS |
| PAT06_2009-11-06 08:10 | SUCESS |
| PAT07_2009-11-07 08:10 | ERROR |
| PAT08_2009-11-08 08:10 | SUCESS |
| PAT09_2009-11-09 08:10 | SUCESS |
| PAT10_2009-11-10 08:10 | SUCESS |
| PAT11_2009-11-11 08:10 | SUCESS |
| PAT12_2009-11-12 08:10 | STOP |
| PAT13_2009-11-13 08:10 | SUCESS |
| PAT14_2009-11-14 08:10 | SUCESS |
| PAT15_2009-11-15 08:10 | SUCESS |
| PAT16_2009-11-16 08:10 | SUCESS |

[ Select ]   [ Cancel ]

FIG. 9B

| Logging system | |
|---|---|
| TIME-PROCESSOR-TEST ITEM | |

○ Test start : 2009/11/17 08:05:11
○ Test end : 2009/11/17 08:50:10
○ Test result (Success/Error/Stop) Success: Success of automatic periodic test for all processor
Error: Error of automatic periodic test for BP1, BP2, CP1 and CP2 processors
Stop: Stop of automatic periodic test in BP2 test
Cause: Trip occurrence, Device error ○ Test result          BP1

| VARIABLE OVERPOWER | HIGH LPL |
|---|---|
| HIGH LPD | LOW DNBR |
| HIGH PRESSURIZER PRESSURE | LOW PRESSURIZER PRESSURE |
| LOW SG-1 WATER LEVEL | LOW SG-2 WATER LEVEL |
| LOW-LOW SG-1 WATER LEVEL | LOW-LOW SG-2 WATER LEVEL |
| HIGH SG-1 WATER LEVEL | HIGH SG-2 WATER LEVEL |
| LOW SG-1 PRESSURE | LOW SG-2 PRESSURE |
| HIGH CONTAINMENT PRESSURE | HI-HI CONTAINMENT PRESSURE |
| LOW SG-1 REACTOR COOLANT FLOW | LOW SG-2 REACTOR COOLANT FLOW |
| CPC-CWP | HIGH PRESSURIZER PRESSURE PRETRIP |
| AI MODULE | DI MODULE |

FIG. 9C

| Logging system | | BP1 VARIABLE OVERPOWER TEST RESULT(TABLE) | | | | | | |
|---|---|---|---|---|---|---|---|---|
| | | VARIABLE OVERPOWER | | | | | | |
| | | | BP | | | | CP | |
| | ERROR STATUS | | PROCESS VALUE | PRETRIP SETPOINT | TRIP SETPOINT | PRETRIP | TRIP | PRETRIP INPUT | TRIP INPUT |
| STEP 01 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |
| STEP 02 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |
| STEP 03 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |
| STEP 04 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |
| STEP 05 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |
| STEP 06 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |
| STEP 07 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |
| STEP 08 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |
| STEP 09 | 0 | REF. | XXXX.XXX E/U | XXXX.XXX E/U | XXXX.XXX E/U | 0 | 0 | 0 | 0 |
| | | RESULT | 0.000 | 0.000 | 0.000 | 0 | 0 | 0 | 0 |

AUTOMATED PERIODIC SURVEILLANCE TESTING METHOD AND APPARATUS IN DIGITAL REACTOR PROTECTION SYSTEM

CROSS-REFERENCE TO RELATED APPLICATION

This application claims the benefit of Korean Patent Application No. 10-2009-0129818, filed on Dec. 23, 2009, in the Korean Intellectual Property Office, the disclosure of which is incorporated herein by reference.

BACKGROUND

1. Field of the Invention

The present invention relates to an automated periodic surveillance testing method and apparatus in a digital reactor protection system, and more particularly, to an automated periodic surveillance testing method and apparatus in a digital reactor protection system, which unites a passive testing means such as a self-diagnosis or an on-line state comparison with an active testing means such as an automatic logic test and the like in the digital reactor protection system.

2. Description of the Related Art

A reactor projection system performs a function of protecting a nuclear reactor, so that a nuclear power plant is maintained in a safe state and radiation and radioactive substances are not leaked to an exterior of the nuclear power plant even when an accident occurs in the nuclear power plant. Therefore, the reactor projection system is a system that plays the most important role in the safety and reliability of the nuclear power plant.

Accordingly, the reactor protection system periodically performs a surveillance test with respect to safety-related functions based on the periodic surveillance test period (typically, 31 days) specified in the operation manual. Generally, in a periodic surveillance test, one of multiple channels (four channels) is rerouted (hereinafter, detoured), the test for the detoured channel is performed. When the test for the one channel is completed, the detoured state is cancelled, and the test is identically performed for another channel.

However, the periodic surveillance testing method in the reactor protection system may cause economical loss due to excessive time consumption and errors due to tests performed by people. For example, in the case of Uljin nuclear power plants 5 and 6 that employ a digital reactor protection system, the time consumed in a periodic surveillance test of the digital reactor protection system is about five days per nuclear power plant.

The time consumed in the periodic surveillance test of the digital reactor protection system is five times longer than the time consumed in a periodic surveillance test of an analog reactor protection system, which is about one day. Therefore, the advantage of an automatic test function performed by the digital reactor protection system is not used and is more deteriorated as compared with the analog reactor protection system. The time consumed in the periodic surveillance test of the digital reactor protection system is long since a digital reactor protection system has a more complex structure than the analog reactor protection system, the number of test items is greatly increased.

Therefore, a testing apparatus and method in a digital reactor protection system, which minimizes time consumed in a periodic surveillance test and automates tests and diagnostic means including a self-diagnosis, an on-line state diagnosis, an automatic logic test, and the like, is desired.

SUMMARY

An aspect of the present invention provides an automated periodic surveillance testing method and apparatus in a digital reactor protection system, in which a periodic surveillance test of the digital reactor protection system is automated using an automatic test and diagnosis function obtained by digitalizing an automatic logic test, a device self-diagnosis, an on-line state diagnosis and the like, so that the time consumed in a periodic surveillance test can be minimized, thereby reducing reactor operating costs, and so that excessive manpower can be avoided, thereby decreasing potential human errors.

Another aspect of the present invention also provides an automated periodic surveillance testing method and apparatus in a digital reactor protection system, in which a test and diagnosis means such as a self-diagnosis, an on-line state diagnosis and an automatic logic test is used and automated as a means for a periodic surveillance test, so that the periodic surveillance test can be performed without a channel detour manually operated by an operator during the operation of the digital reactor protection system.

An automated periodic surveillance testing method and apparatus in a digital reactor protection system according to embodiments of the present invention independently uses a three-step test and diagnosis function and complementarily cooperate.

According to an aspect of the present invention, an automated periodic surveillance testing apparatus in a digital reactor protection system is continuously operated by a diagnosis function built in the digital reactor protection system, and checks the surveillance of a memory, the surveillance of an input/output device, the surveillance of an operating system and the surveillance of a communication device. The checked diagnosis record is recorded and managed by an automatic test report system, thereby performing self-diagnosis.

According to an aspect of the present invention, an automated periodic surveillance testing apparatus in a digital reactor protection system compares state information of a bistable processor and a coincident processor in an automatic test and interface processor, thereby performing on-line state diagnosis. The digital reactor protection system includes independent multiple channels (typically, four channels) and has multiple performance in a channel. Thus, the digital reactor protection system detects a fault path through constant comparison, set value comparison, process state comparison, result value comparison and the like based on the multiple performance of the digital reactor protection system. The pulsatile signal for each processor increases a signal value with a constant period in a normal state. When an error in a processor exists, the signal value is beyond a fixed range. Therefore, the signal value is used to detect a fault. The checked record is recorded and managed by an automatic test report system.

According to an aspect of the present invention, an automated periodic surveillance testing apparatus in a digital reactor protection system performs an automatic logic test as a test periodically performed by the digital reactor protection system.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 5A to 5C are tables illustrating classified faults and system management items of self-diagnosis information recorded in an automatic test report system of the automated periodic surveillance testing apparatus in the digital reactor protection system according to an embodiment of the present invention;

FIG. 8 is a table illustrating examples of permission, restricted and stop conditions for the automatic periodic test in an ATIP, a bistable processor, and a coincidence processor according to an embodiment of the present invention;

FIGS. 9A to 9C are diagrams illustrating functions for the automatic test report system of the automated periodic surveillance testing apparatus in the digital reactor protection system according to an embodiment of the present invention.

DETAILED DESCRIPTION

Figure 1:
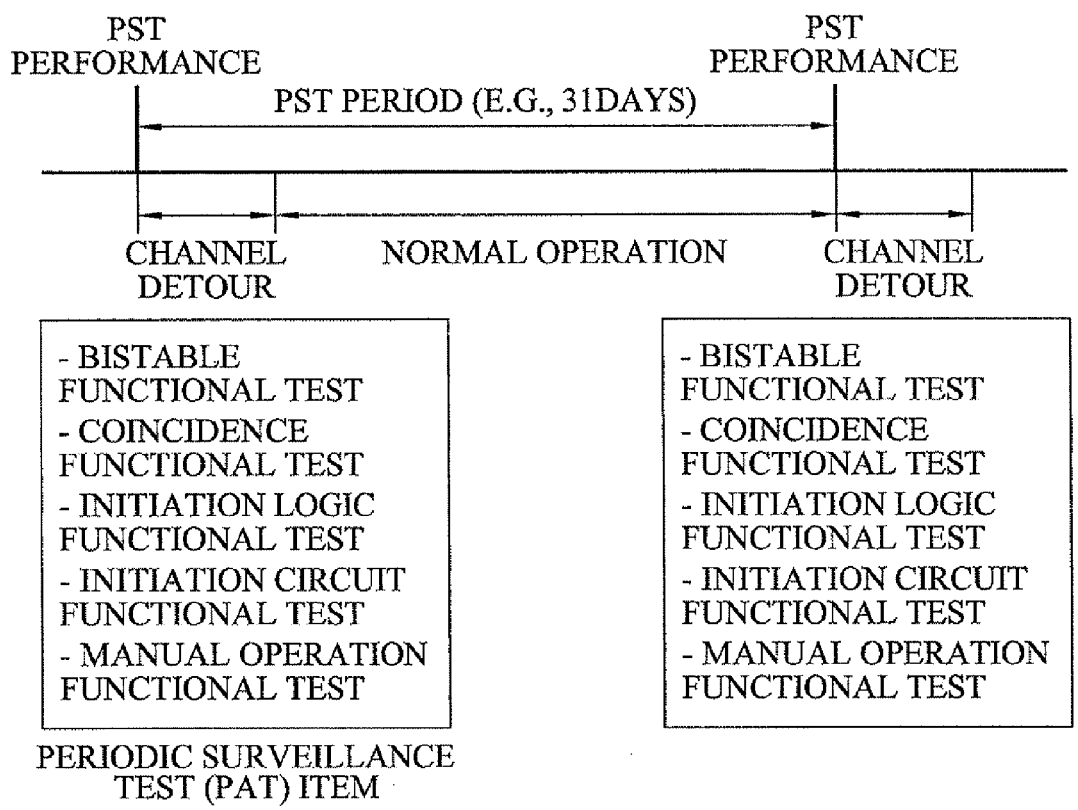
FIG. 1 is a conceptual diagram illustrating a conventional periodic surveillance test in a reactor protection system.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a conceptual diagram illustrating a conventional periodic surveillance test in a reactor protection system.

Referring to FIG. 1, a periodic surveillance testing apparatus in the reactor protection system periodically performs a surveillance test with respect to safety-related functions based on a periodic surveillance test period (typically, 31 days).

In a periodic surveillance test, the periodic surveillance testing apparatus in the reactor protection system detours one of multiple channels (four channels) and performs the test with respect to the detoured channel. When the test for the one channel is completed, the periodic surveillance testing apparatus cancels the detoured state and performs an identical test with respect to another channel.

Specifically, the periodic surveillance testing apparatus in the reactor protection system may perform the periodic surveillance test with respect to periodic surveillance testing items including a bistable functional test, a coincidence functional test, an initiation logic functional test, an initiation circuit functional test and a manual operation functional test.

Figure 2:
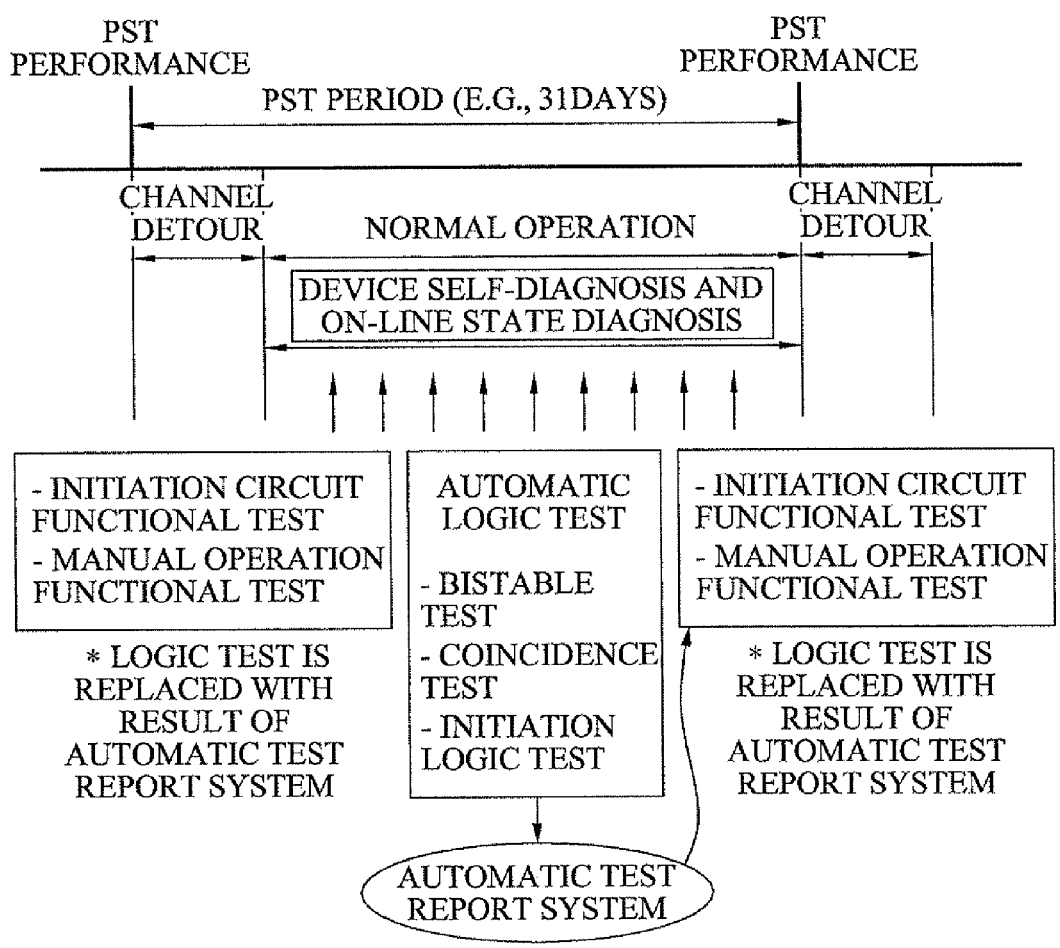
FIG. 2 is a conceptual diagram illustrating a periodic surveillance testing method in a digital reactor protection system according to an embodiment of the present invention.

FIG. 2 is a conceptual diagram illustrating a periodic surveillance testing method in a digital reactor protection system according to an embodiment of the present invention.

Referring to FIG. 2, an automated periodic surveillance testing apparatus in the reactor protection system periodically performs a surveillance test with respect to safety-related functions based on the periodic surveillance test period (typically, 31 days).

In a periodic surveillance test, the automated periodic surveillance testing apparatus in the digital reactor protection system detours one of multiple channels (four channels), performs the test with respect to the detoured channel. When the test for the one channel is completed, the automated periodic surveillance testing apparatus cancels the detoured state and performs an identical test with respect to another channel.

Unlike the related art periodic surveillance testing apparatus, the automated periodic surveillance testing apparatus in the digital reactor protection system may perform the periodic surveillance test with respect to periodic surveillance testing items including only the initiation circuit functional test and the manual operation functional test, and exclude the bistable functional test, the coincidence functional test, and the initiation logic functional test.

After the test for the detoured channel is completed, the automated periodic surveillance testing apparatus in the digital reactor protection system may continuously perform a test with respect to the digital reactor protection system through a self-diagnosis and an on-line state diagnosis including an automatic logic test during a normal operation. For example, the automatic logic test may include the bistable functional test, the coincidence functional test and the initiation logic functional test.

In this instance, the automated periodic surveillance testing apparatus in the digital reactor protection system allows results obtained by performing the bistable functional test, the coincidence functional test, and the initiation logic functional test to be recorded in a database of an automatic test report system.

Accordingly, the automated periodic surveillance testing apparatus in the digital reactor protection system performs tests with respect to the digital reactor protection system, that is, the bistable functional test, the coincidence functional test, and the initiation logic functional test, during a normal operation, and performs only a test with respect to the analog reactor protection system, that is, only the initiation circuit functional test and the manual operation functional test, during a periodic surveillance test (PST), so that time consumed in the PST and the channel detour can be reduced, thereby remarkably improving economic efficiency and stability.

Figure 3:
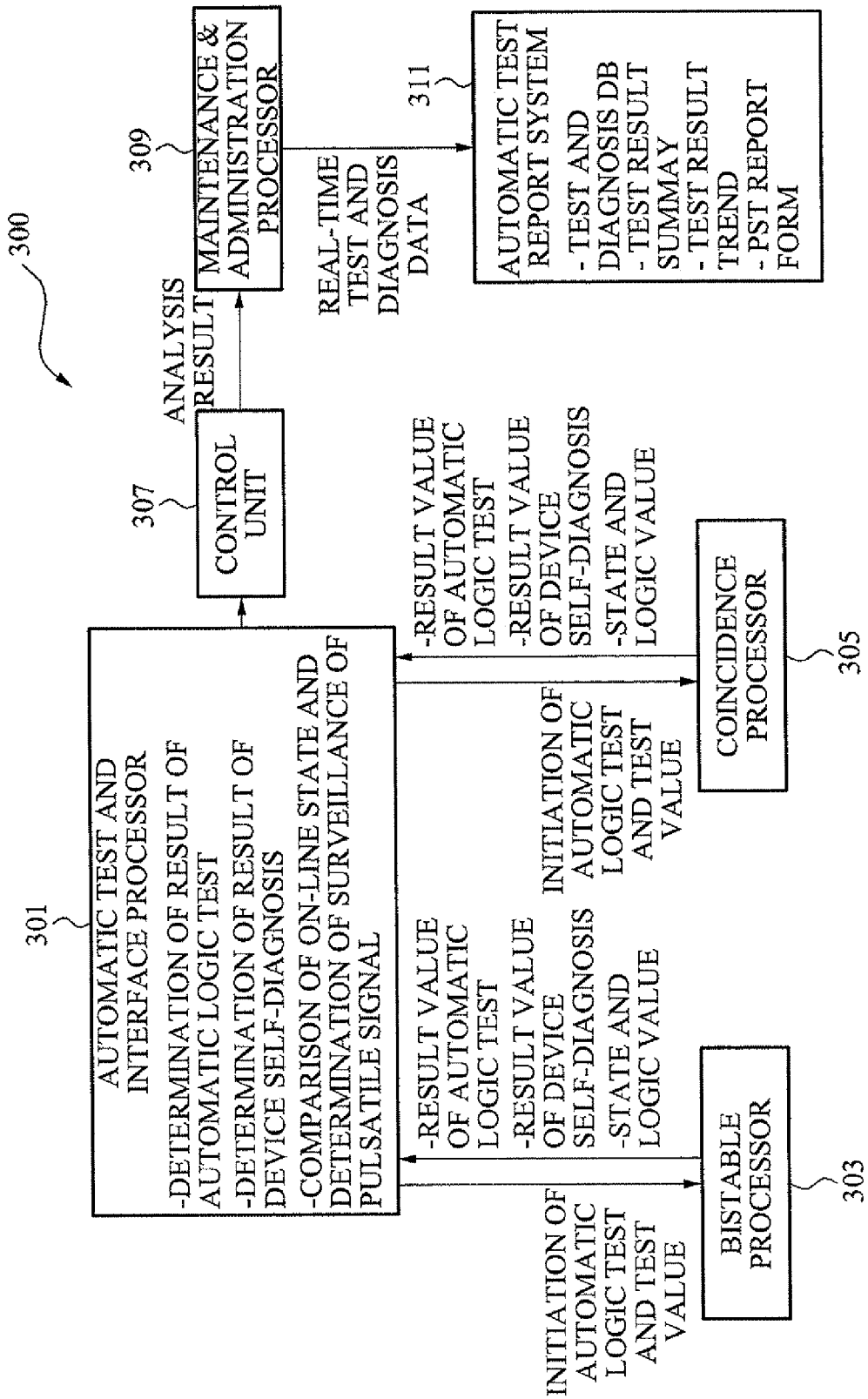
FIG. 3 is a conceptual diagram illustrating an automated periodic surveillance testing apparatus in the digital reactor protection system according to an embodiment of the present invention.

FIG. 3 is a conceptual diagram illustrating an automated periodic surveillance testing apparatus in the digital reactor protection system according to an embodiment of the present invention.

Referring to FIG. 3, the automated periodic surveillance testing apparatus 300 in the digital reactor protection system includes an automatic test and interface processor (ATIP) 301, a bistable processor (BP) 303, a coincidence processor (CP) 305, a control unit 307, a maintenance and administration processor 309 and an automatic test report system 311.

When conditions of a system related to the digital reactor protection system satisfy selected permission conditions, the ATIP 301 generates a test initiation signal including a test value, and transmits the generated test initiation signal to the BP 303 and the CP 305. In this instance, the ATIP 301 may determine whether the conditions of the system satisfy the permission conditions at a predetermined time interval.

For example, the conditions satisfied by the system related to the digital reactor protection system may include when no trip/auxiliary trip data exists in state information from the BP 303 and CP 305 of a self-channel, when no module error in the ATIP 301, the BP 303, and the CP 305 exist, when no manual initiation test and manual test signal exist, when the test result including an abnormal end of the test is not in an error state, when no end signal from a self-test time check timer exist, when no self-channel detour exists, and when a test enabling signal from the ATIP 301 of another channel exists.

The BP 303 may receive a test value and a test initiation signal, inputted from the ATIP 301, to independently determine whether a test enabling or a permission condition exists. In this instance, the CP 303 may determine whether to satisfy the permission conditions at the predetermined time interval.

Here, the permission conditions may include when no trip/auxiliary trip data for all trip variables exists as the result of a previous scan, when no manual initiation automatic test and manual test signal exist, when no error in the BP 303 exists, when no test stop signal from the ATIP 301 exists, when a test start signal from the ATIP 301 exists, when the ID of a processor to be tested, which is received from the ATIP 301, is identified, and when no end signal from the self-test time check timer exists.

The BP 303 may divide a response time (T) permitted to process signals into a plurality of unit times and output a first test result value during n unit times after the test initiation signal is received. The BP 303 may divide the response time in consideration of the unit time for processing a process input value inputted from a process device. Since the BP 303 has a concept of processing hardware in real time, a logic performance result can be provided to the CP 305 within the permitted response time (T). One T/2 in the permitted response time (T) may be assigned to the bistable performance using a real process input value, and the other T/2 in the permitted response time (T) may be assigned as the time for an automatic periodic test. That is, the BP 303 repeatedly performs real bistability and test bistability every processor scan time, thereby preventing the probability that the real and test bistabilities will be related to each other. Unlike the automatic periodic test of the BP 303, the time-division manner is not applied to the automatic periodic test of the CP 305.

The BP 303 may be configured so that the other T/2 is not related to the real bistable performance even when no automatic periodic test for deterministic state-based processing exists. In this instance, the BP 303 may independently perform an on-line self logic diagnosis that determines whether permission conditions for the automatic periodic test exist satisfied. The on-line self logic diagnosis may be performed independently by a self-test scenario without receiving the test initiation signal and the test value inputted from the ATIP 301.

To perform the on-line self logic diagnosis, the BP 303 may include a test input buffer that stores a test value inputted from the ATIP 301 and a test output butter that stores the first test result value corresponding to the test value stored in the test input buffer. That is, the BP 303 may provide the test input buffer in a separate storage space from the process input value, and the test value inputted from the ATIP 301 is stored in the test input buffer, thereby preventing the possibility that the test value and the process input value will be related to each other. Similarly, the BP 303 may be provided with a test output buffer so that a first test result value outputted corresponding to the test value, an intermediate value of the logic result, or the like is stored in the test output buffer. Accordingly, the BP 303 can block the correlation between the first test result value and the data outputted corresponding to the process input value.

The BP 303 may transmit the first test result value outputted as the result of the automatic logic performance to the ATIP 301. Also, the BP 303 may transmit the first test result value outputted as the result of the automatic logic performance to the CP 305 through the communication path between the BP 303 and the CP 305.

The CP 305 may determine whether permission conditions at the predetermined time interval are satisfied. For example, the permission conditions may include when no trip/auxiliary trip data for any trip variable from the BP 303 of all channels exists, when no trip/auxiliary trip data as the result of a previous scan exists, when no manual initiation automatic test and manual test signal exist, when no error in the CP 305 exists, when no test stop signal from the ATIP 301 exists, when a test start signal from the ATIP 301 exists, when the ID of a processor to be tested, which is received from the ATIP 301, is identified, when no end signal from the self-test time check timer exists, when no error in a pulsatile signal of the BP 303 exists, and when no detour for all channels exist.

The CP 305 receives a first test result value from the BP 303 and generates a second test result value based on the received first test result value, so as to output the first and second test result values to the ATIP 301. That is, the CP 305 performs a logical sum (OR) with respect to the test value from the ATIP 301 and the compatible result value transmitted from the BP 303 and then perform a 2/4 voting logic with respect to the result of the logical sum (OR), so that the result of the 2/4 voting logic is input to a trip initiation logic. However, the CP 305 may disable the result of the 2/4 voting logic to be outputted to an initial circuit during the automatic periodic test.

For example, the start prohibition conditions in which the automatic periodic test is not permitted in the CP 305 may include when a trip/auxiliary trip state exists where the bistable result value from the BP 303 is one or more, when a trip/auxiliary trip state in the previous scan period exists, and the like. When the automatic periodic test starts, the trip initiation logic caused by the automatic periodic test is a fault trip, and therefore, the automatic periodic test can be prevented.

The CP 305 may include a test input buffer that stores a test value inputted from the ATIP 301. That is, like the BP 303, the CP 305 may include a separated test input buffer so as to prevent the interruption of a real trip and a fault trip, caused by the automatic periodic test. However, a test output buffer may not be separately included in the CP 305.

The control unit 307 outputs the analysis result for the data path between the BP 303 and the CP 305 using the first test result value corresponding to the test value from the BP 303 and the second test result value corresponding to the test value from the CP 305, which respond to the test initiation signal. In this instance, the control unit 307 may receive the analysis result for the data path between the BP 303 and the CP 305 from the ATIP 301 and output the received analysis result, but is not limited thereto. That is, the control unit 307 may generate the analysis result for the data path between the BP 303 and the CP 305 using the received first and second test result values and output the generated analysis result.

Specifically, the control unit 307 may provide the result obtained by determining the relationship degree between the first and second test result values to the maintenance and administration processor 309. Here, the maintenance and administration processor 309 may be a cabinet operator module.

The maintenance and administration processor 309 may provide the state information and test results of all processors in the channels. The maintenance and administration processor 309 may store the result obtained by determining the relationship degree between the first and second test result values in the automatic test report system 311.

Figure 4:
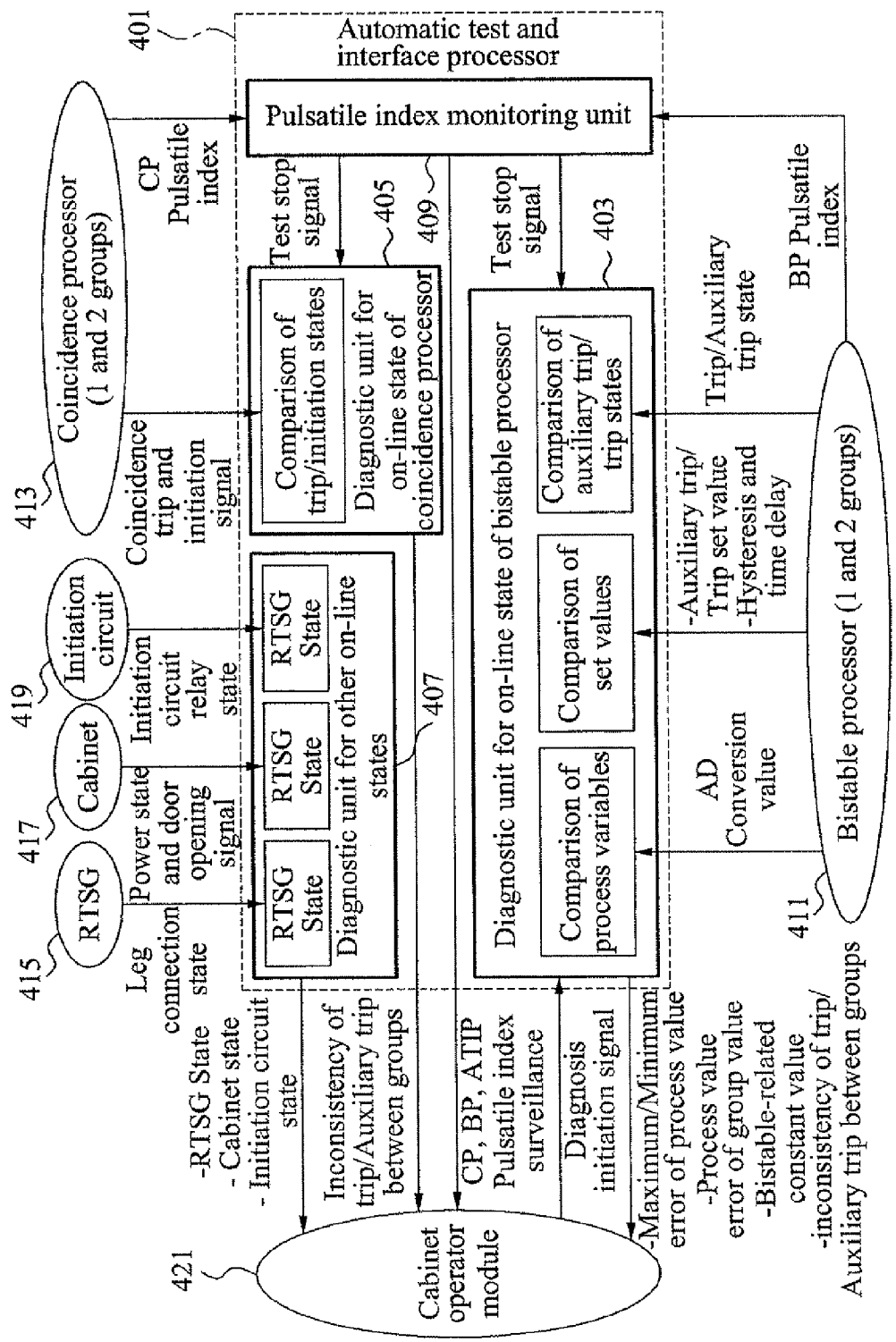
FIG. 4 is a diagram illustrating a configuration of an on-line state diagnosis as a partial configuration for an automatic test and interface processor (ATIP) of the automated periodic surveillance testing apparatus in the digital reactor protection system according to an embodiment of the present invention.

FIG. 4 is a diagram illustrating the configuration of an on-line state diagnosis as a partial configuration for an ATIP of the automated periodic surveillance testing apparatus in the digital reactor protection system according to an embodiment of the present invention.

Referring to FIG. 4, the ATIP may periodically perform an on-line state diagnosis in the normal operation of the digital reactor protection system and diagnose the entire state in channels and surveillance of processors.

Here, objects for the on-line state diagnosis includes a process input value necessary for protection logic performance, a set value used in bistability, a pulsatile index for identifying the state of bistability, and coincidence performance and the surveillance of processors.

An ATIP 401 performs a state diagnosis such as a comparison between state values by receiving system state information from devices related to unique system functions, such as a BP 411, a CP 413, and an initiation circuit, and transmits the result of the state diagnosis to a cabinet operator module 421.

The ATIP 401 receives process variables, set values, trip/auxiliary trip states, pulsatile signals and the like from the BP 411 and CP 413 in all channels (four channels) and all groups (multiplication in a channel) and performs a diagnosis through comparison. Then, the ATIP 401 transmits the diagnosis result to the cabinet operator module 421 through an inter-channel communication network.

Specifically, the ATIP 401 includes a BP on-line state diagnostic unit 403, a CP on-line state diagnostic unit 405, another on-line state diagnostic unit 407, and a pulsatile index monitoring unit 409.

When comparing and monitoring process variable values, the BP on-line state diagnostic unit 403 receives A/D conversion values for process variables of the BP 411 in all channels and two groups in a channel and compares the process variable values of the two groups with each other. When a variation greater than a fixed value occurs, the BP on-line state diagnostic unit 403 provides an error signal to the cabinet operator module 421.

When comparing and monitoring set values, the BP on-line state diagnostic unit 403 receives bistable set values from the BP 411 in two groups in the channel through the inter-channel communication network and performs comparison and monitoring. Simultaneously, the BP on-line state diagnostic unit 403 receives a set value constant from the ATIP 401 in another channel through the inter-channel communication network and performs comparison and monitoring.

The BP on-line state diagnostic unit 403 compares and monitors a hysteresis of the BP on-line state diagnostic unit 403 and a hysteresis value provided from the BP 411.

The BP on-line state diagnostic unit 403 receives a fixed auxiliary trip/trip set value from the BP 411 and compares the fixed auxiliary trip/trip set value with its own constant value, thereby testing the surveillance of the fixed set value.

The BP on-line state diagnostic unit 403 has a function of identifying whether a current process value and a set value corresponding to the current process value are suitable for manual reset variable set value auxiliary trip/trip set values. The BP on-line state diagnostic unit 403 receives a fixed step value, a high/low limit value, and current trip/auxiliary trip set values from the BP 411. The BP on-line state diagnostic unit 403 compares the bistable constant value with its own constant value.

The BP on-line state diagnostic unit 403 identifies the difference between current and past auxiliary trip/trip set values with respect to rate limit variable set value auxiliary trip/trip set values and determines whether the difference is smaller than a rate limit value.

When monitoring the ratio of auxiliary trip/trip states, the BP on-line state diagnostic unit 403 identifies whether the auxiliary trip/trip states in the two groups in the channel correspond to each other. If the auxiliary trip/trip states do not correspond to each other, the BP on-line state diagnostic unit 403 provides the result to the cabinet operator module 421.

The CP on-line state diagnostic unit 405 performs comparison between coincident states from the CP 413 in all channel and groups in a channel and transmits the result to the cabinet operator module 421. Accordingly, whether the coincidence for the function of stopping a nuclear reactor and the function of initiating ESF operation is correctly established can be identified.

The other on-line state diagnostic unit 407 receives state signals from a Reactor Trip Switch Gear (RTSG) 415, a system cabinet 417, and an initiation circuit 419 and diagnoses the surveillance of these equipments. Then, the other on-line state diagnostic unit 407 transmits the result to the cabinet operator module 421.

The pulsatile index monitoring unit 409 monitors the pulsatile index of each of the processors (BP1, BP2, CP1, and CP2 in the self-channel, and ATIP in the other channel) and transmits the result to the cabinet operator module 421. The pulsatile index monitoring unit 409 stops the on-line state diagnosis and the automatic logic test when an error of the pulsatile signal occurs.

The automated periodic surveillance testing apparatus in the digital reactor protection system detects a fault of a digital device by employing an independent analog watchdog timer. The analog watchdog timer always monitors pulsatile signals generated from an upper processor module. If the fault of a corresponding upper processor is detected, the analog watchdog timer controls the digital reactor protection system to be in a trip state. The path having the analog watchdog timer applied thereto is as follows.

BP and CP in group 1
BP and CP in group 2
ATIP

The automated periodic surveillance testing apparatus in the digital reactor protection system continuously monitors pulsatile signals by employing a software watchdog timer of the processor module. When the fault of a corresponding processor is detected, the software watchdog timer controls the digital reactor protection system to be in a trip state and provides an alarm to an operator.

1) When a fault of the BP 411 is monitored, the BP 411 periodically transmits a pulsatile signal to the CP 413 through a data link module. When the pulsatile signal is lost by the software watchdog timer or does not have an expected value, the CP 413 detects the BP 411 as a fault and considers that signals inputted from the BP 411 are all in the trip state.

When an error occurs, the CP 413 considers that the signals inputted from the BP 411 are all in the trip state, using diagnostic information of HR-SDL linked with the BP 411.

The BP 411 periodically transmits a pulsatile signal to the ATIP 401 through a data communication module. When the pulsatile signal is lost by the software watchdog timer or does not have an expected value, the ATIP 401 detects the BP 411 as a fault and transmits an alarm signal (RPS Trouble) to an alarm system.

2) When a fault of the CP 413 is monitored, the corresponding hardware watchdog timer is timed out to cut off power supplied to an initiation relay in the fault of the CP 413.

The CP 413 periodically transmits a pulsatile signal to the BP 411 and the ATIP 401. When the pulsatile signal is lost by the software watchdog timer or does not have an expected value, the BP 411 maintains all detour-related signals of the CP 413 to be in a predetermined state.

When an error occurs, the BP 411 maintains all signals inputted from the CP 413 to be in the predetermined state, using diagnostic information of the HR-SDL linked with the CP.

When the pulsatile signal is lost by the software watchdog timer or does not have an expected value, the ATIP 401 detects the CP 413 as a fault and transmits the alarm signal (RPS Trouble) to the alarm system.

3) When a fault of the ATIP 401 is monitored, the corresponding hardware watchdog timer is timed out, and provides an alarm signal (RPS Error) to a core protection calculator in the fault of the ATIP 401.

When an error occurs while monitoring pulsatile signals of the in the ATIP in the other channel and the ATIP in the BP and CP in the same channel, the automatic logic test is prohibited.

In addition, when communications are impossible, the automatic logic test is prohibited using an inter-channel communication network and diagnostic information of the inter-channel communication network.

4) When a fault of an input/output module is monitored, the fault of analog and digital input cards of the BP 411 is detected by the processor module, and process variables related to the fault are set in the trip state.

The fault of a digital input card of the CP 413 is detected by the CP 413, and a detour request signal related to the fault is maintained in the predetermined state. The fault of a relay output card of the CP 413 is detected by the CP 413, and an initiation logic output related to the fault is set in the trip state.

FIGS. 5A to 5C are tables illustrating classified faults and system management items of self-diagnosis information recorded in an automatic test report system of the automated periodic surveillance testing apparatus in the digital reactor protection system.

Referring to FIGS. 5A to 5C, the automated periodic surveillance testing apparatus in the digital reactor protection system according to the embodiment of the present invention uses a device self-diagnosis function of each processor (BP, CP, ATIP and COM) so as to continuously check the surveillance of devices in the digital reactor protection system.

The automated periodic surveillance testing apparatus in the digital reactor protection system may classify device self-diagnosis results into important, non-important, and simple faults depending on the importance degree of the diagnosis result.

Here, the important fault is a fault where it is determined that the safety function of a system or channel cannot be performed due to the fault, and the corresponding fault generates the trip state of a group. The state of the fault is provided to a cabinet operator module, an operator module, an alarm system and an information processing system.

The non-importance fault is a fault that does not have influence on a trip function but has influence on a system operation. A diagnosis result is provided to the cabinet operator module, the operator module, the alarm system and the information processing system, and an alarm is provided to an operator.

The simple fault is a fault that does not have influence on the system operation and is considered as operation support information. When the simple fault occurs, a diagnosis result is provided to the information processing system through the cabinet operator module.

The automated periodic surveillance testing apparatus in the digital reactor protection system classifies device self-diagnosis information according to the seriousness degree of the system. That is, the device self-diagnosis information is used as a trip function, a detour function or alarm/information in each of the processors. When an error in the device self-diagnosis information occurs under conditions permitted in the automatic logic test, the ATIP may prohibit the automatic logic test.

Figure 6:
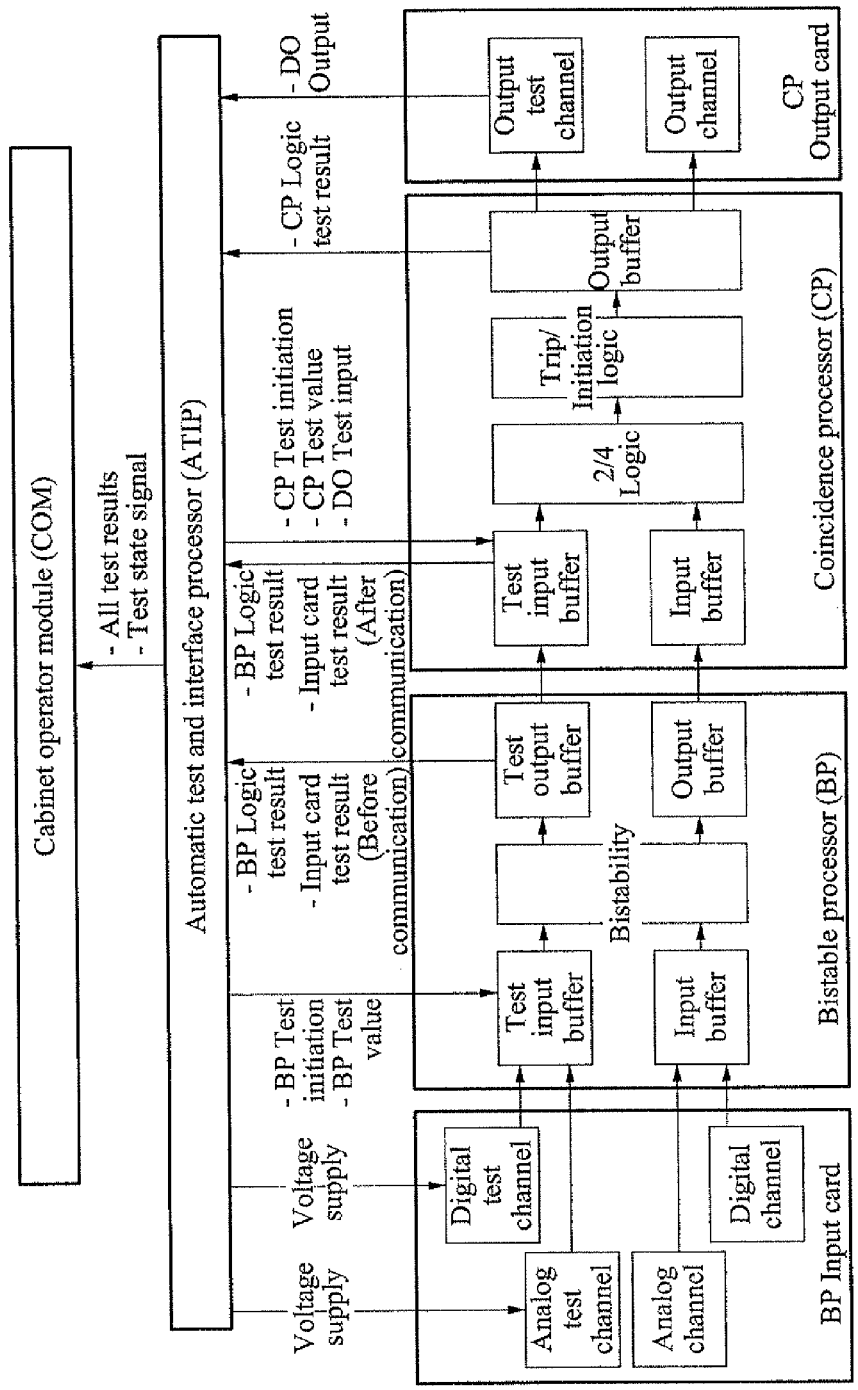
FIG. 6 is a diagram illustrating a concept in which a test input value/test result value transmitted to each processor in an automatic periodic test has no influence on natural functions of the digital reactor protection system in the automated periodic surveillance testing apparatus of the digital reactor protection system according to an embodiment of the present invention.

FIG. 6 is a diagram illustrating the concept in which a test input value/test result value transmitted to each processor in an automatic periodic test has no influence on natural functions of the digital reactor protection system in the automated periodic surveillance testing apparatus of the digital reactor protection system according to an embodiment of the present invention.

The BP may be provided with a storage space separated from a process input value, i.e., a test input buffer, so as to test bistability using a test value inputted from the ATIP. The BP stores the inputted test value in the test input buffer, thereby blocking the correlation between the test value and the process input value.

The BP may be provided with a test output buffer so that a first test result value outputted corresponding to the test value, an intermediate value of the logic result, and the like is stored in the test output buffer. Accordingly, it is possible to block the correlation between the first test result value and the data outputted corresponding to the process input value.

Like the BP, the CP may be provided with a separate test input buffer so as to prevent the interruption of a real trip and a fault trip, caused by the automatic periodic test. However, unlike the BP, the CP may not separately include the test output buffer.

When the test permission conditions are satisfied, the CP performs a logical sum (OR) with respect to the test value from the ATIP and the compatible result value transmitted from the BP, and then perform a 2/4 voting logic with respect to the result of the logical sum (OR) so that the result of the 2/4 voting logic is input to a trip initiation logic. However, the CP may disable the result of the 2/4 voting logic to be outputted to an initial circuit during the automatic periodic test.

For example, the start prohibition conditions in which the automatic periodic test is not permitted in the CP may include when a trip/auxiliary trip state that the bistable result value from the BP is one or more exists, when a trip/auxiliary trip state in the previous scan period exists, and the like. When the automatic periodic test starts, the trip initiation logic caused by the automatic periodic test is a fault trip, and therefore, the automatic periodic test can be prevented.

Figure 7:
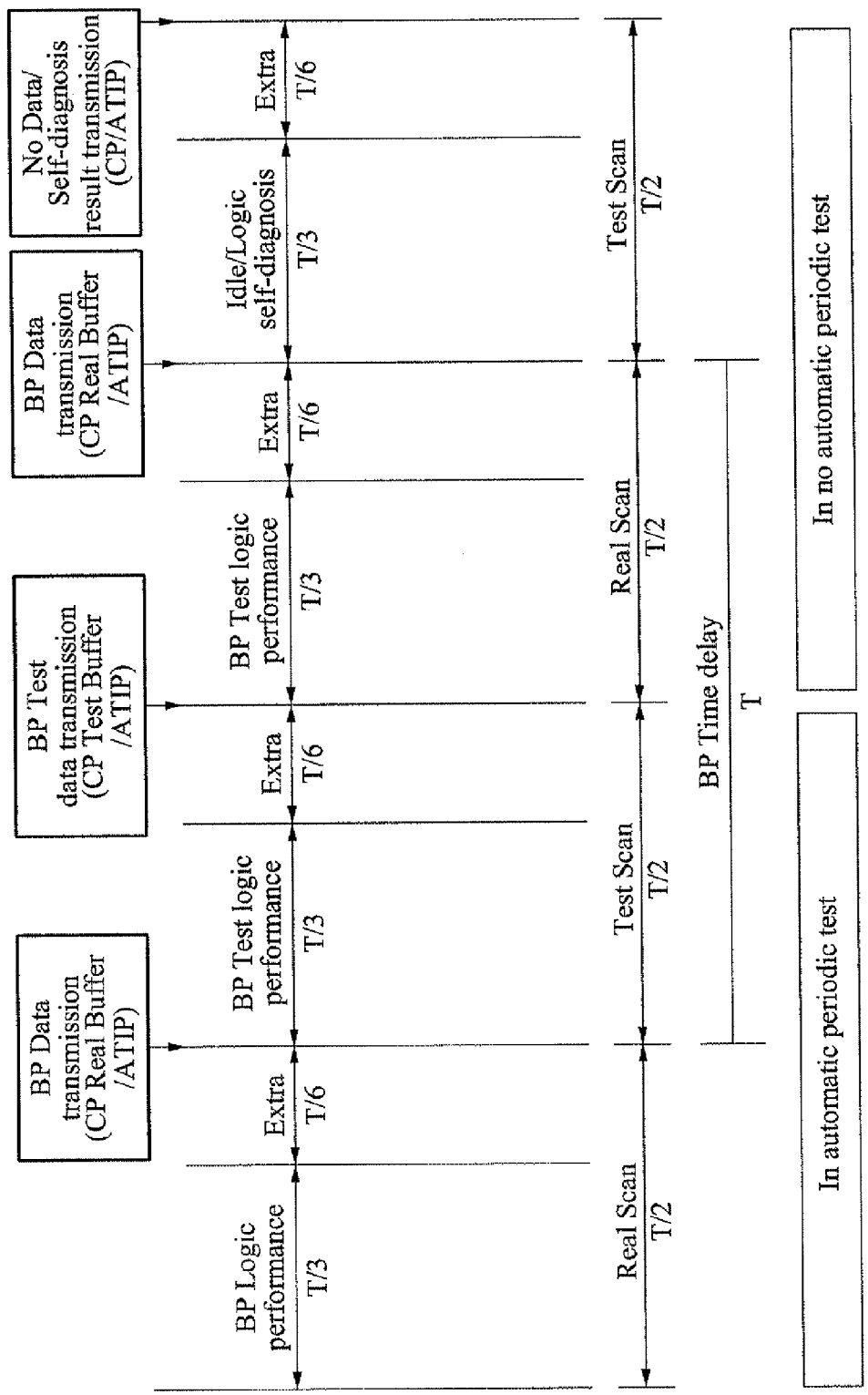
FIG. 7 is a diagram illustrating a concept in which bistability for performing natural functions of the digital reactor protection system and bistability performance for the automatic periodic test are separated in a time-division manner in the automated periodic surveillance testing apparatus of the digital reactor protection system according to an embodiment of the present invention.

FIG. 7 is a diagram illustrating the concept in which bistability for performing the natural functions of the digital reactor protection system and bistability performance for the automatic periodic test are separated in a time-division manner in the automated periodic surveillance testing apparatus of the digital reactor protection system according to an embodiment of the present invention.

Since the BP has a concept of processing hardware in real time, a logic performance result can be transmitted to the CP within the permitted response time (T). One T/2 in the permitted response time (T) may be assigned to the bistable performance using a real process input value, and the other T/2 in the permitted response time (T) may be assigned as the time for an automatic periodic test. That is, the BP repeatedly performs real bistability and test bistability every processor scan time, thereby preventing the probability that the real and test bistabilities will be related to each other.

The BP may be configured so that the other T/2 is not related to the real bistable performance even when no automatic periodic test for deterministic state-based processing exists. In this instance, the BP may perform an on-line self logic diagnosis that determines whether permission conditions for the automatic periodic test are satisfied. The on-line self logic diagnosis may be independently performed by a self-test scenario without receiving the test initiation signal and the test value inputted from the ATIP.

Unlike the automatic periodic test of the BP, the time-division manner is not applied to the automatic periodic test of the CP.

FIG. 8 is a table illustrating examples of permission, prohibition, and stop conditions for the automatic periodic test in an ATIP, a BP and a CP according to an embodiment of the present invention.

When the ATIP satisfies all of the examples of the permission condition illustrated in FIG. 8 (AND operation), a test initiation signal including a test value may be sequentially provided to the BP and CP. When the BP and the CP satisfy all of the examples of the permission condition illustrated in FIG. 8 (AND operation), bistability and coincidence may be performed based on the test input value.

However, when at least one of conditions designated by 'O' are not satisfied among the examples of the permission condition, the ATIP, the BP and the CP may prohibit or stop the automatic periodic test. For example, when a trip/auxiliary trip state in state information from the self-channel BP/CP exists, the automatic periodic test in the ATIP cannot be permitted. When a trip/auxiliary trip state in the previous scan period exists, the automatic periodic test in the BP cannot be permitted. When a trip/auxiliary trip state that the bistable result value from the BP is one or more exists or when a trip/auxiliary trip state in the previous scan period exists, the automatic periodic test in the CP cannot be permitted.

FIGS. 9A to 9C are diagrams illustrating functions for the automatic test report system of the automated periodic surveillance testing apparatus in the digital reactor protection system according to an embodiment of the present invention.

Referring to FIGS. 9A to 9C, the automatic test report system may perform a selection function for each type of test, a summary function for each type of test, and a report function for detail test result.

Here, the selection function for each type of test is a function that selects a result for each type of test. The selection function for each type of test may summarize success/failure for each day and test item selection and result for each processor and provide the results in the form of a table or chart. For example, the selection function for each type of test may be provided as illustrated in FIG. 9A.

That is, the automatic test report system may receive any one selected from an on-line state diagnosis, a device self-diagnosis, an automatic periodic test and a manual initiation automatic test. If the automatic periodic test is selected, the automatic test report system may summarize results such as success, stop, and error for the automatic periodic test for each processor and provide the summarized results.

The summary function for each type of test is a function that provides the entire test summary for each test and analyzes test errors and stop causes. For example, the summary function for each type of test may be provided as illustrated in FIG. 9B.

That is, the automatic test report system may provide test states of success/error/stop and provide detailed analysis for each of the test states. For example, the automatic test report system may provide analysis for when the automatic periodic test for all processors succeeds, when an error occurs in the automatic periodic test for BP1, BP2, CP1 and CP2, or when the automatic periodic test for BP2 is stopped due to the occurrence of a trip and the error of a device.

The report function for detail test results is a function that specifies and provides test inputs and test result values. For example, the report function for detail test result may be provided as illustrated in FIG. 9C.

That is, the automatic test report system may specify test inputs and test result values and provide the variable overpower test result for BP1 in detail.

Figure 10:
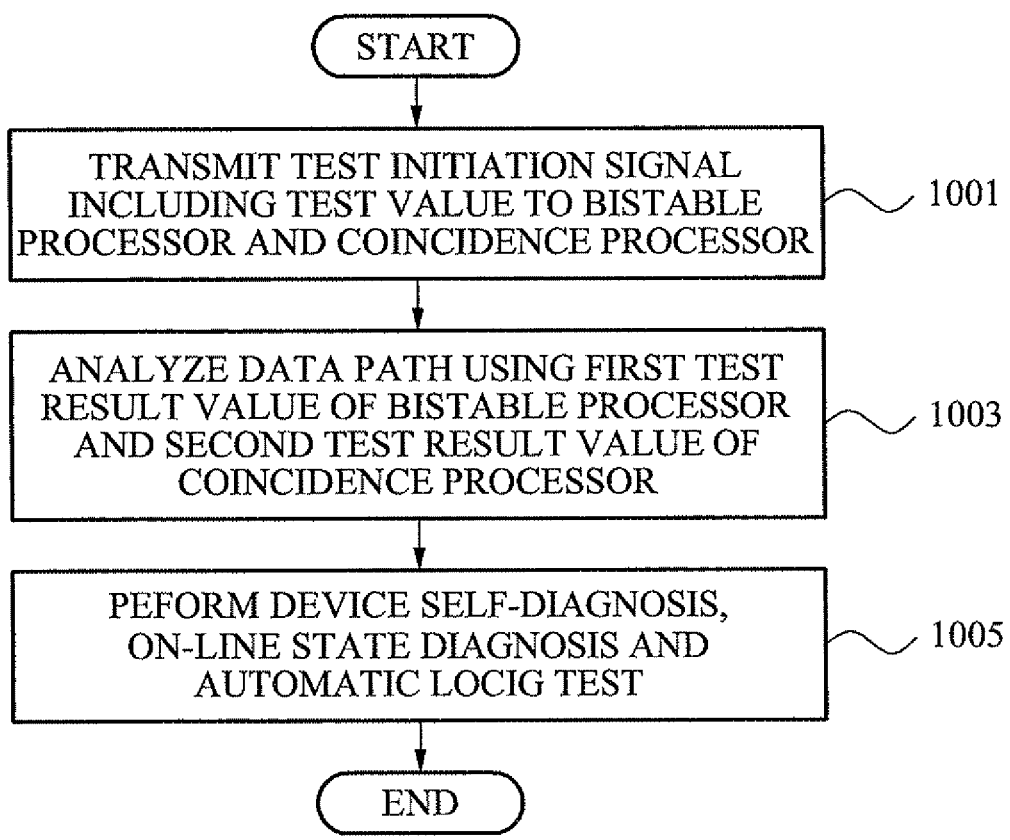
FIG. 10 is a flowchart illustrating an automated periodic surveillance testing method in a digital reactor protection system according to an embodiment of the present invention.

FIG. 10 is a flowchart illustrating an automated periodic surveillance testing method in a digital reactor protection system according to an embodiment of the present invention.

Referring to FIG. 10, when system conditions related to the digital reactor protection system satisfy selected permission conditions, an ATIP generates a test initiation signal including a test value and transmits the generated test initiation signal to a BP and a CP in operation 1001.

In this instance, the ATIP may determine whether the permission conditions at a predetermined time interval are satisfied.

The BP may receive the test initiation signal and the test value from the ATIP and independently determine whether a test enabling or permission condition are satisfied. When the condition is true, the BP may perform automatic logic based on the test input value. In this instance, the BP may determine whether the permission conditions at the predetermined time interval are satisfied.

The BP may divide a response time (T) allocated to process signals into a plurality of unit times, and output a first test result value during n unit times after the test initiation signal is received. The BP may divide the response time in consideration of the unit time for processing a process input value inputted from a process device. Since the BP has a concept of processing hardware in real time, a logic performance result can be transmitted to the CP within the permitted response time (T). One T/2 in the permitted response time (T) may be assigned to the bistable performance using a real process input value, and the other T/2 in the permitted response time (T) may be assigned as the time for an automatic periodic test. That is, the BP repeatedly performs real bistability and test bistability every processor scan time, thereby preventing the probability that the real and test bistabilities will be related to each other. Unlike the automatic periodic test of the BP, the time-division manner is not applied to the automatic periodic test of the CP.

The BP may be configured so that the other T/2 is not related to the real bistable performance even when no automatic periodic test for deterministic state-based processing exists. In this instance, the BP may independently perform an on-line self logic diagnosis that determines whether permission conditions for the automatic periodic test are satisfied. The on-line self logic diagnosis may be independently performed by a self-test scenario without inputting receiving the test initiation signal and the test value inputted from the ATIP.

To configure the BP so that the other T/2 is not related to the real bistable performance, the BP may include a test input buffer that stores a test value inputted from the ATIP and a test output butter that stores the first test result value corresponding to the test to value stored in the test input buffer. That is, the BP may provide the test input buffer in a separate storage space from the process input value, and the test value inputted from the ATIP is stored in the test input buffer, thereby preventing the possibility that the test value and the process input value will be related to each other. Similarly, the BP may be provided with a test output buffer so that a first test result value outputted corresponding to the test value, an intermediate value of the logic result, and the like is stored in the test output buffer. Accordingly, the BP can block the correlation between the first test result value and the data outputted corresponding to the process input value.

The BP may transmit the first test result value outputted as the result of the automatic logic performance to the ATIP. Also, the BP may transmit the first test result value outputted as the result of the automatic logic performance to the CP through the communication path between the BP and the CP.

The CP may determine whether permission conditions at the predetermined time interval are satisfied. For example, the permission conditions may include when no trip/auxiliary trip for any trip variable from the BP of all channels exists, when no trip/auxiliary trip as the result of a previous scan exists, when no manual initiation automatic test and manual test signal exists, when no error in the CP exists, when no test stop signal from the ATIP exists, when a test start signal from the ATIP exists, when the ID of a processor to be tested, which is received from the ATIP, is identified, when no end signal from the self-test time check timer exists, when no error in a pulsatile signal of the BP exists, and when no detour for all channels exist.

The CP receives a first test result value from the BP and generates a second test result value based on the received first test result value so as to output the first and second test result values to the ATIP. That is, the CP performs a logical sum (OR) with respect to the test value from the ATM and the compatible result value transmitted from the BP and then performs a 2/4 voting logic with respect to the result of the logical sum (OR), so that input the result of the 2/4 voting logic to a trip initiation logic. However, the CP may disable the result of the 2/4 voting logic to be outputted to an initial circuit during the automatic periodic test.

For example, the start prohibition conditions in which the automatic periodic test is not permitted in the CP may include when a trip/auxiliary trip state where the bistable result value from the BP is one or more exists, when a trip/auxiliary trip state in the previous scan period exists, and the like. When the automatic periodic test starts, the trip initiation logic caused by the automatic periodic test is a fault trip, and therefore, the automatic periodic test can be prevented.

The CP may include a test input buffer that stores a test value inputted from the ATIP. That is, like the BP, the CP may include a separated test input buffer so as to prevent the interruption of a real trip and a fault trip, caused by the automatic periodic test. However, a test output buffer may not be separately included in the CP.

Subsequently, a control unit outputs the analysis result for the data path between the BP and the CP using the first test result value corresponding to the test value from the BP 303 and the second test result value corresponding to the test value from the CP, which response the test initiation signal in operation 1003.

That is, the control unit may provide the result obtained by determining the relationship degree between the first and second test result values to a maintenance and administration processor.

Subsequently, the ATIP performs a device self-diagnosis, an on-line state diagnosis and an automatic logic test in operation 1005.

That is, while the ATIP may perform a surveillance test with respect to an initiation circuit functional test and a manual operation functional test during the periodic surveillance test, the ATIP may perform a surveillance test with respect to an automatic logic test including a bistable functional test, a coincidence functional test and an initiation logic functional test during the normal operation.

In this instance, the ATIP may classify device self-diagnosis results into important, non-important, and simple faults depending on the importance degree of the diagnosis result.

Here, the important fault is a fault where it is determined that the safety function of a system or channel cannot be performed due to the fault, and the corresponding fault generates the trip state of a group. The state of the fault is provided to a cabinet operator module, an operator module, an alarm system, and an information processing system.

The non-importance fault is a fault that does not have influence on a trip function and has influence on a system operation. A diagnosis result is provided to the cabinet operator module, the operator module, the alarm system and the information processing system, and an alarm is provided to an operator.

The simple fault is a fault that does not have influence on the system operation and is considered as operation support information. When the simple fault occurs, a diagnosis result is provided to the information processing system through the cabinet operator module.

Subsequently, the ATIP may periodically perform an on-line state diagnosis in the normal operation of the digital reactor protection system and diagnose the entire state in channels and surveillance of processors. Here, objects for the on-line state diagnosis includes a process input value necessary for protecting logic performance, a set value used in bistability, a pulsatile index for identifying the state of bistability and coincidence performance and the surveillance of processors.

An ATIP performs a state diagnosis such as a comparison between state values by receiving system state information from devices related to unique system functions, such as a BP, a CP and an initiation circuit, and transmits the result of the state diagnosis to a cabinet operator module.

The ATIP receives process variables, set values, trip/auxiliary trip states, pulsatile signals and the like from the BP and CP in all channels (four channels) and all groups (multiplication in a channel) and performs a diagnosis through comparison. Then, the ATIP transmits the diagnosis result to the cabinet operator module through an inter-channel communication network.

Specifically, the ATIP may perform comparison between two groups in a channel with respect to the process variable, set value and trip/auxiliary trip state of the BP and may perform comparison between groups with respect to the coincidence state of the CP in the groups in a channel. Also, the ATIP may diagnose surveillance using state signals from an RTSG, a system cabinet, and an initiation circuit, and may monitor pulsatile indices of the BP, CP and the ATIP.

According to embodiments of the present invention, a device self-diagnosis, an on-line state diagnosis and an automatic logic test are used as the automated periodic surveillance testing method in the digital reactor protection system. Thus, the time consumed in a periodic surveillance test can be minimized, thereby reducing reactor operating costs, and excessive manpower can be avoided, thereby decreasing potential human errors.

According to embodiments of the present invention, the channel detour time at which one of multiple channels is detoured can be minimized based on the automated periodic surveillance test in the digital reactor protection system, thereby enhancing stability.

The automated periodic surveillance testing method according to the above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An automated periodic surveillance testing apparatus, the apparatus comprising:
  an automatic test and interface processor (ATIP) to generate a test initiation signal including a test value and to transmit the generated test initiation signal to a bistable processor (BP) and a coincidence processor (CP), when system conditions related to the digital reactor protection system satisfy selected permission conditions; and
  a control unit to output an analysis result for the data path between the BP and the CP using a first test result value corresponding to the test value from the BP and a second test to result value corresponding to the test value from the CP, which respond to the test initiation signal,
  wherein:
    the ATIP performs at least one of a device self-diagnosis, an on-line state diagnosis and an automatic logic test with respect to the digital reactor protection system; and
    the ATIP comprises:
      a BP on-line state diagnostic unit to perform comparison between two groups in a channel with respect to at least one of a process variable, a set value, and a trip/auxiliary trip state of the BP;
      a CP on-line state diagnostic unit to perform a comparison between groups with respect to a coincidence state of the CP of a group in a channel;
      another on-line state diagnostic unit to diagnose surveillance using a state signal from a Reactor Trip Switch Gear (RTSG), system cabinet or initiation circuit; and
      a pulsatile index monitoring unit to monitor at least one of pulsatile indices of the BP, the CP and the ATIP.

2. The apparatus of claim 1, wherein the ATIP performs a surveillance test with respect to an initiation circuit functional test or manual operation functional test in a periodic surveillance test, and performs a surveillance test with respect to the automatic logic test including at least one of a bistable functional test, a coincidence functional test and an initiation logic functional test in a normal operation.

3. The apparatus of claim 1, wherein the ATIP performs a self-diagnosis to determine a fault as an important, non-important, or simple fault with respect to the digital reactor protection system by using at least one of device self-diagnosis functions of the PB, the CP and the ATIP.

4. The apparatus of claim 1, wherein the BP divides a response time permitted in signal processing into a plurality of unit times and outputs the first test result value for n unit times after the test initiation signal is received.

5. The apparatus of claim 1, wherein the CP receives the first test result value from the BP and outputs the second test result value based on the received first test result value.

6. The apparatus of claim 1, wherein at least one of the ATIP, the BP and the CP determines whether permission conditions at a predetermined time interval are satisfied.

7. An automated periodic surveillance testing method in a digital reactor protection system, the method comprising:
  generating a test initiation signal including a test value and transmitting the generated test initiation signal to a BP and a CP, when system conditions related to the digital reactor protection system satisfy selected permission conditions in an ATIP;
  allowing a control unit to output an analysis result for the data path between the BP and the CP using a first test result value corresponding to the test value from the BP and a second test result value corresponding to the test value from the CP, which respond to the test initiation signal;
  performing at least one of a device self-diagnosis, an on-line state diagnosis and an automatic logic test with respect to the digital reactor protection system;
  performing comparison between two groups in a channel with respect to at least one of a process variable, a set value and a trip/auxiliary trip state of the BP;
  performing comparison between groups with respect to a coincidence state of the CP of a group in a channel;
  diagnosing surveillance using a state signal from an RTSG, system cabinet or initiation circuit; and
  monitoring at least one of pulsatile indices of the BP, the CP, and the ATIP.

8. The method of claim 7, further comprising:
  performing a surveillance test with respect to an initiation circuit functional test or manual operation functional test in a periodic surveillance test in the digital reactor protection system; and
  performing a surveillance test with respect to the automatic logic test including at least one of a bistable functional test, a coincidence functional test, and an initiation logic functional test in a normal operation in the digital reactor protection system.

9. The method of claim 7, further comprising:
  performing a self-diagnosis determine a fault as an important, non-important, or simple fault with respect to the digital reactor protection system by using at least one of device self-diagnosis functions of the PB, the CP, and the ATIP.

10. The method of claim 7, further comprising allowing the BP to divide a response time permitted in signal processing into a plurality of unit times, and outputting the first test result value for n unit times after the test initiation signal is received.

11. The method of claim 7, further comprising allowing the CP to receive the first test result value from the BP and to output the second test result value based on the received first test result value.

12. The method of claim 7, further comprising allowing at least one of the ATIP, the BP and the CP to determine whether permission conditions at a predetermined time interval are satisfied.

* * * * *